(12) United States Patent
Fang et al.

(10) Patent No.: US 9,278,632 B2
(45) Date of Patent: Mar. 8, 2016

(54) CHILD SAFETY SEAT ASSEMBLY

(71) Applicant: Wonderland Nurserygoods Company Limited, Central Hong Kong (HK)

(72) Inventors: Gangqing Fang, Central Hong Kong (HK); Guang-Hui Zhao, Central Hong Kong (HK)

(73) Assignee: Wonderland Nurserygoods Company Limited (HK)

( * ) Notice: Subject to any disclaimer, the term of this patent is extended or adjusted under 35 U.S.C. 154(b) by 468 days.

(21) Appl. No.: 13/709,111

(22) Filed: Dec. 10, 2012

(65) Prior Publication Data

US 2013/0140864 A1 Jun. 6, 2013

(30) Foreign Application Priority Data

Dec. 2, 2011 (CN) .......................... 2011 1 0396116

(51) Int. Cl.
*A47C 1/08* (2006.01)
*B60N 2/28* (2006.01)

(52) U.S. Cl.
CPC ............ *B60N 2/2821* (2013.01); *B60N 2/2863* (2013.01)

(58) Field of Classification Search
CPC .................................................... B60N 2/2821
USPC .............................................. 297/130, 256.16
See application file for complete search history.

(56) References Cited

U.S. PATENT DOCUMENTS

| 5,277,472 | A | * | 1/1994 | Freese et al. | 297/130 |
| 6,017,088 | A | * | 1/2000 | Stephens et al. | 297/256.16 |
| 6,070,890 | A | * | 6/2000 | Haut et al. | 280/47.38 |
| 6,367,875 | B1 | * | 4/2002 | Bapst | 297/250.1 |
| 6,428,100 | B1 | * | 8/2002 | Kain et al. | 297/256.16 |
| 6,715,828 | B1 | * | 4/2004 | Cheng | 297/183.3 |
| 7,004,541 | B2 | * | 2/2006 | Sedlack | 297/256.13 |
| 8,393,678 | B2 | * | 3/2013 | Keegan et al. | 297/256.16 |
| 8,882,196 | B2 | * | 11/2014 | Williams et al. | 297/256.16 |
| 2005/0264062 | A1 | * | 12/2005 | Longenecker et al. | 297/250.1 |
| 2011/0233903 | A1 | * | 9/2011 | Williams et al. | 280/648 |

* cited by examiner

*Primary Examiner* — Matthew Ing
(74) *Attorney, Agent, or Firm* — David I. Roche; Baker & McKenzie LLP

(57) ABSTRACT

A child safety seat assembly includes a base having two fixed anchoring hooks, a seat shell detachably installed with the base, two catching collars pivotally assembled with the seat shell, the collars being operable to respectively engage with the anchoring hooks to hold the seat shell with the base, and a release actuator operatively connected with the catching collars, the release actuator being operable to rotate the catching collars to disengage the catching collars from the anchoring hooks.

20 Claims, 11 Drawing Sheets

CHILD SAFETY SEAT ASSEMBLY

CROSS-REFERENCE TO RELATED APPLICATION

This application claims priority to Chinese Patent Application No. 201110396116.8 filed on Dec. 2, 2011, incorporated herein by reference.

BACKGROUND

1. Field of the Invention

The present invention relates to child safety seat assemblies.

2. Description of the Related Art

Current safety legislations require the use of a child safety seat for seating a young child in a motor vehicle. A child safety seat may typically include a seat shell that is placed on a base for providing stable support on the vehicle passenger's seat. Unfortunately, the current locking devices used to attach the seat shell with the base may be complex in structure, and not convenient to operate.

Therefore, there is a need for a child safety seat assembly that is easy to install, reliable in use, and address at least the foregoing issues.

SUMMARY

The present application describes a child safety seat assembly that can detachably install a seat shell on a base. The child safety seat includes a base having two fixed anchoring hooks, a seat shell detachably installed with the base, two catching collars pivotally assembled with the seat shell, the catching collars being operable to respectively engage with the anchoring hooks to hold the seat shell with the base, and a release actuator operatively connected with the catching collars, the release actuator being operable to rotate the catching collars to disengage the catching collars from the anchoring hooks.

DETAILED DESCRIPTION OF THE EMBODIMENTS

Figure 1:
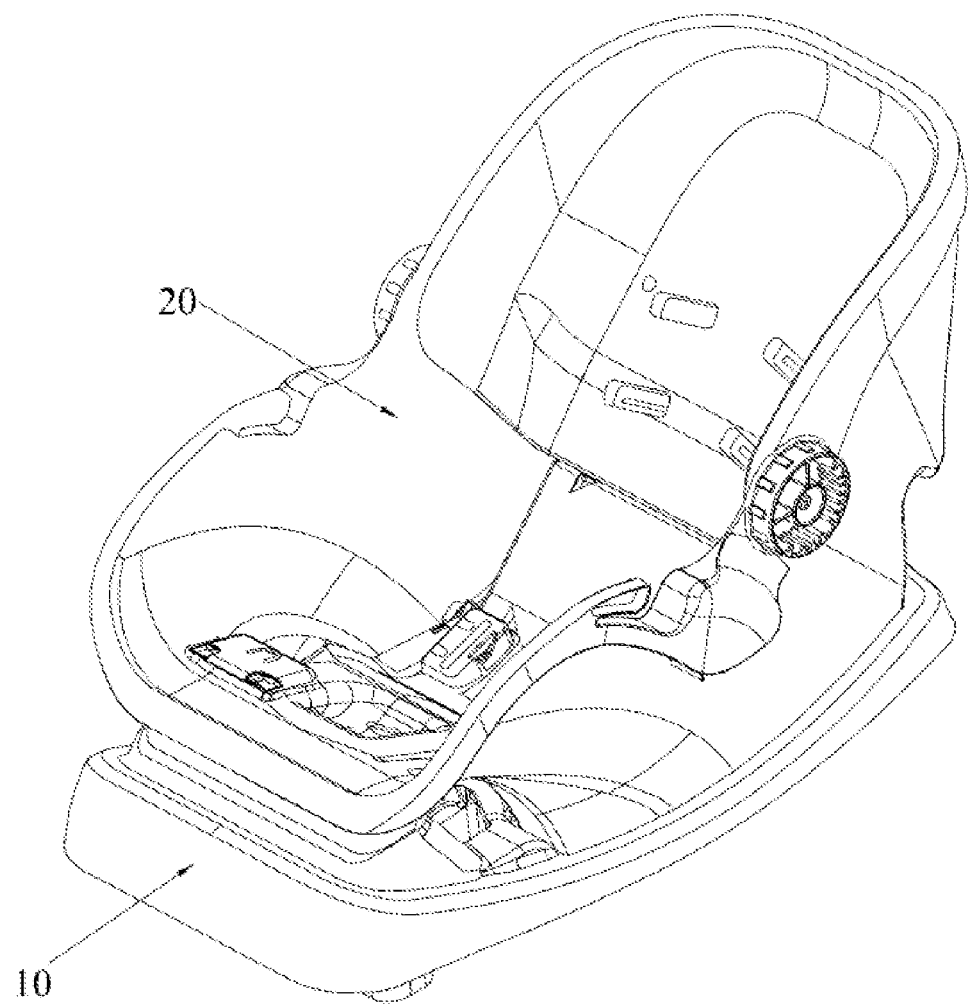
FIG. 1 is a perspective view illustrating an embodiment of a child safety seat assembly including a seat shell and a base.
Figure 2:
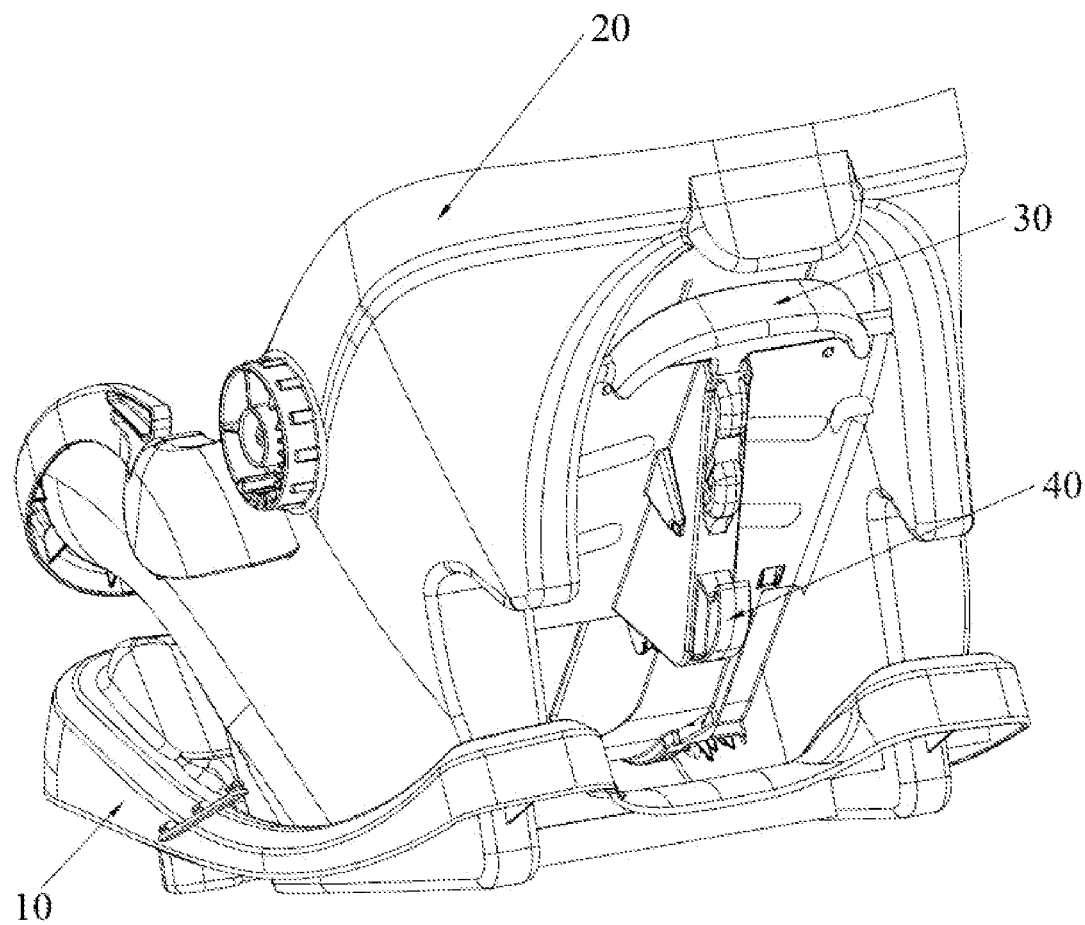
FIG. 2 is a perspective view illustrating a rear of the child safety seat assembly.

FIGS. 1-4 are schematic views illustrating an embodiment of a child safety seat assembly including a base 10, a seat shell 20, a release actuator 30, a connector 40 and two lock mechanisms 50. The seat shell 20 can be made of a plastic body that can be installed on and removed from the base 10. The release actuator 30 is movably assembled with the seat shell 20, and is operatively connected with the two lock mechanisms 50. The connector 40 is assembled with the seat shell 20, and is coupled with the release actuator 30. The release actuator 30, the connector 40 and the two lock mechanisms 50 can be disposed along a backrest of the seat shell 20.

The two lock mechanisms 50 can be operable to lock the seat shell 20 with the base 10 at two attachment points, so that the seat shell 20 can be securely held with the base 10. In other embodiments, the seat shell 20 can be used with a stroller frame, the connector 40 being operable to attach the seat shell 20 with the stroller frame.

Figure 3:
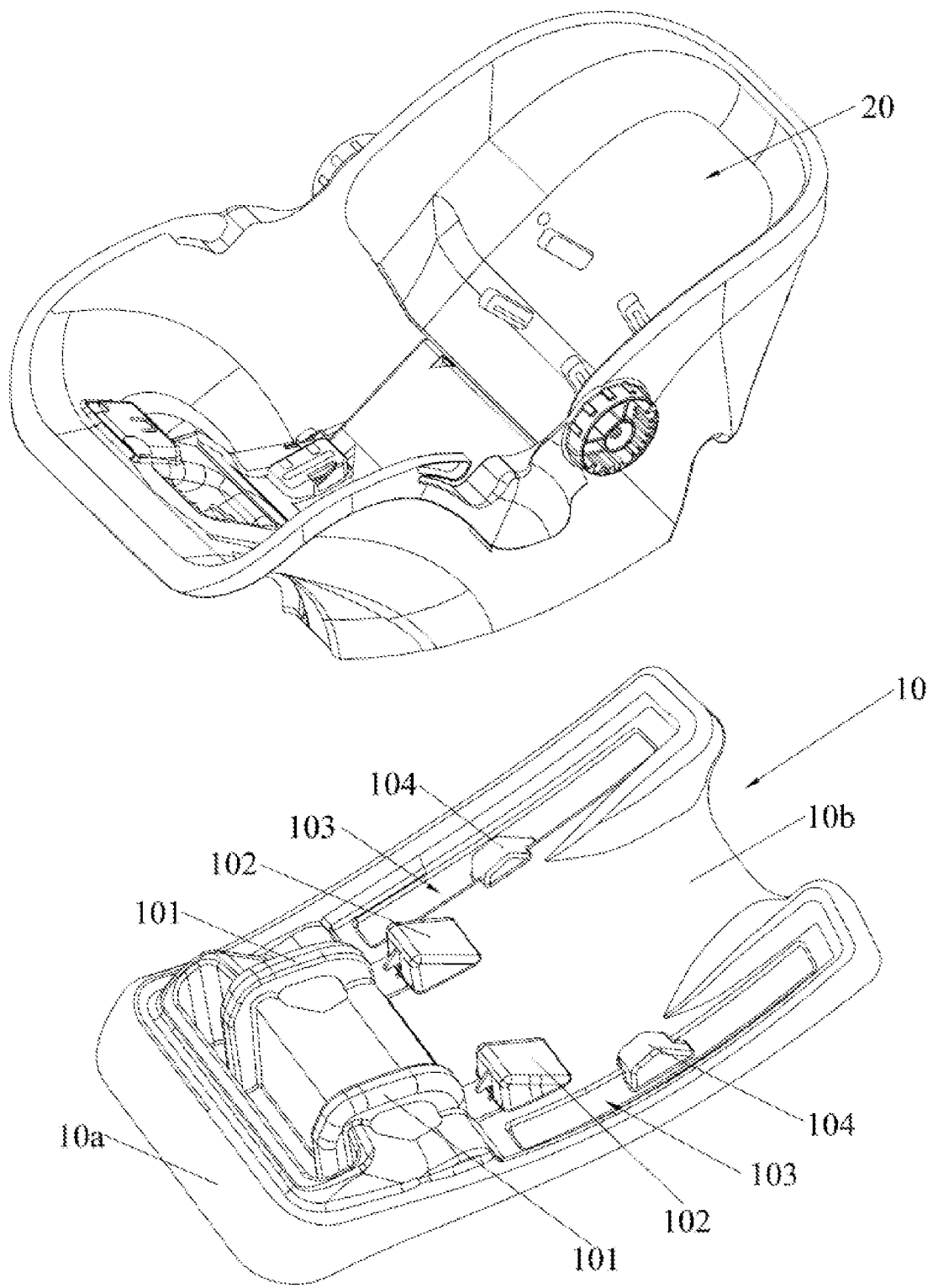
FIG. 3 is a schematic view illustrating the seat shell detached from the base.
Figure 4:
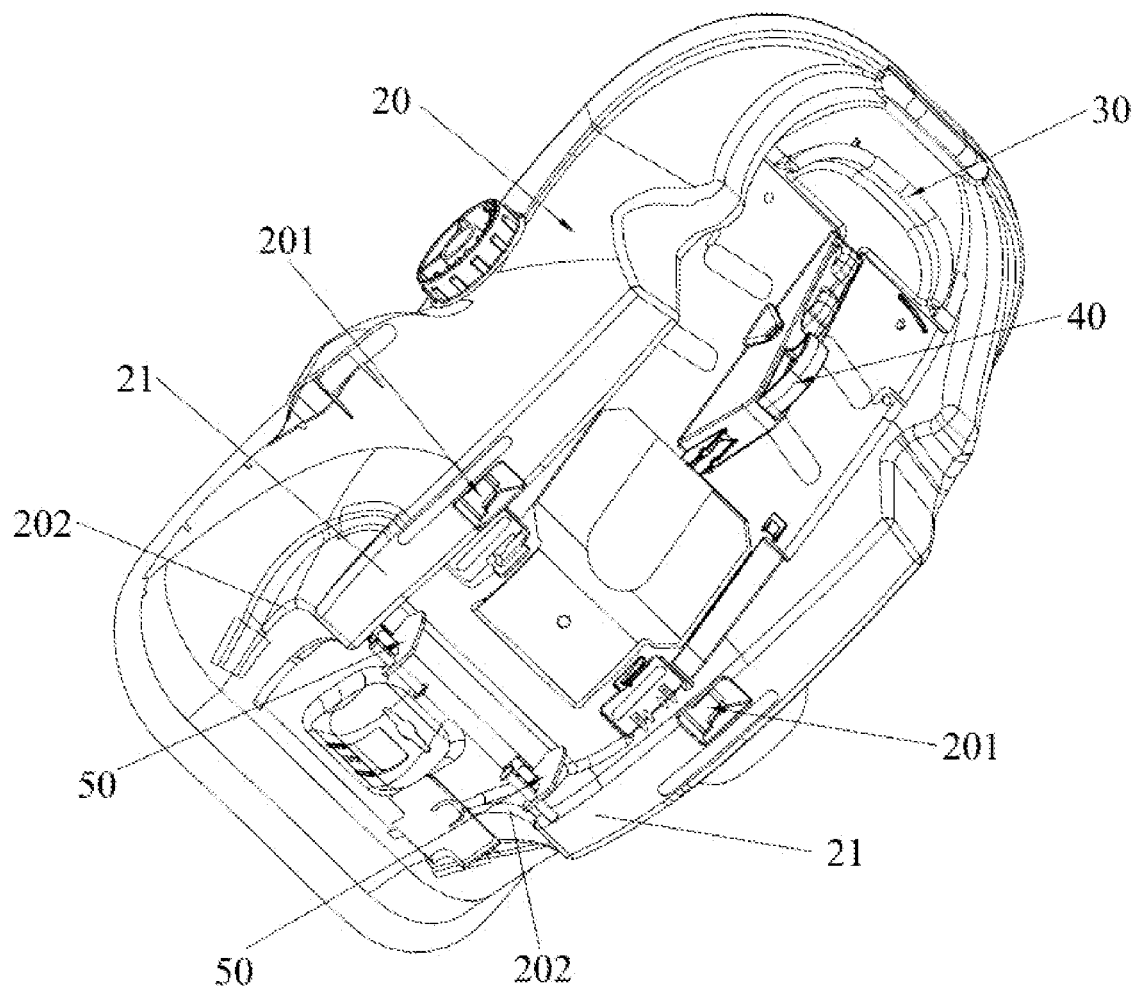
FIG. 4 is a perspective view illustrating an underside of the seat shell.

Referring to FIGS. 3 and 4, the base 10 can have a front portion 10a, a rear portion 10b, and a plurality of structural features that are transversally spaced apart from each other including two support portions 101 and two guide members 102 protruding upward and spaced apart from each other, two elongated slots 103 and two raised portions 104. The two support portions 101 are located adjacent to the front portion 10a of the base 10, and can have upper surfaces that are respectively inclined to face the rear portion 10b of the base 10.

The two guide members 102 can be disposed in a middle region of the base 10 at positions adjacent to and lengthwise aligned with the two support portions 101. The guide members 102 can also have upper support surfaces that are respectively inclined to face the rear portion 10b of the base 10. In some embodiments, the guide members 102 may have a height that is smaller than the height of the support portions 101.

The two elongated slots 103 can be disposed at two lateral sides of the base 10, in particular adjacent to the outer sides of the guide members 102 and behind the support portions 101.

The raised portions 104 can be respectively disposed adjacent to the elongated slots 103. As shown in FIG. 3, the region of the guide members 102 can be located between the region of the raised portions 104 and that of the support portions 101 along a lengthwise axis of the base 10. The raised portions 104 can be used as alignment structures to ensure that the seat shell 20 is correctly placed on the base 10.

Referring to FIG. 4, an underside of the seat shell 20 can include two protruding ribs 21 that can be transversally spaced apart from each other and have an elongated shape. Each of the ribs 21 can have a lower surface provided with an opening 201, and a front abuttal area 202. When the seat shell 20 is installed on the base 10, the ribs 21 can be respectively received in the two elongated slots 103, and the openings 201 can respectively receive the engagement of the raised portions 104 to restrainedly position the seat shell 20 on the base 10. Moreover, the abuttal areas 202 of the seat shell 20 can respectively rest in contact against the support portions 101 of the base 10.

The arrangement of the guide members 102 and the elongated slots 103 can facilitate the installation of the seat shell 20 on the base 10. Moreover, the inclination of the support portions 101 with support surfaces facing rearward can effectively prevent the seat shell 20 from flipping rearward when a collision occurs at the rear of the vehicle.

Figure 5:
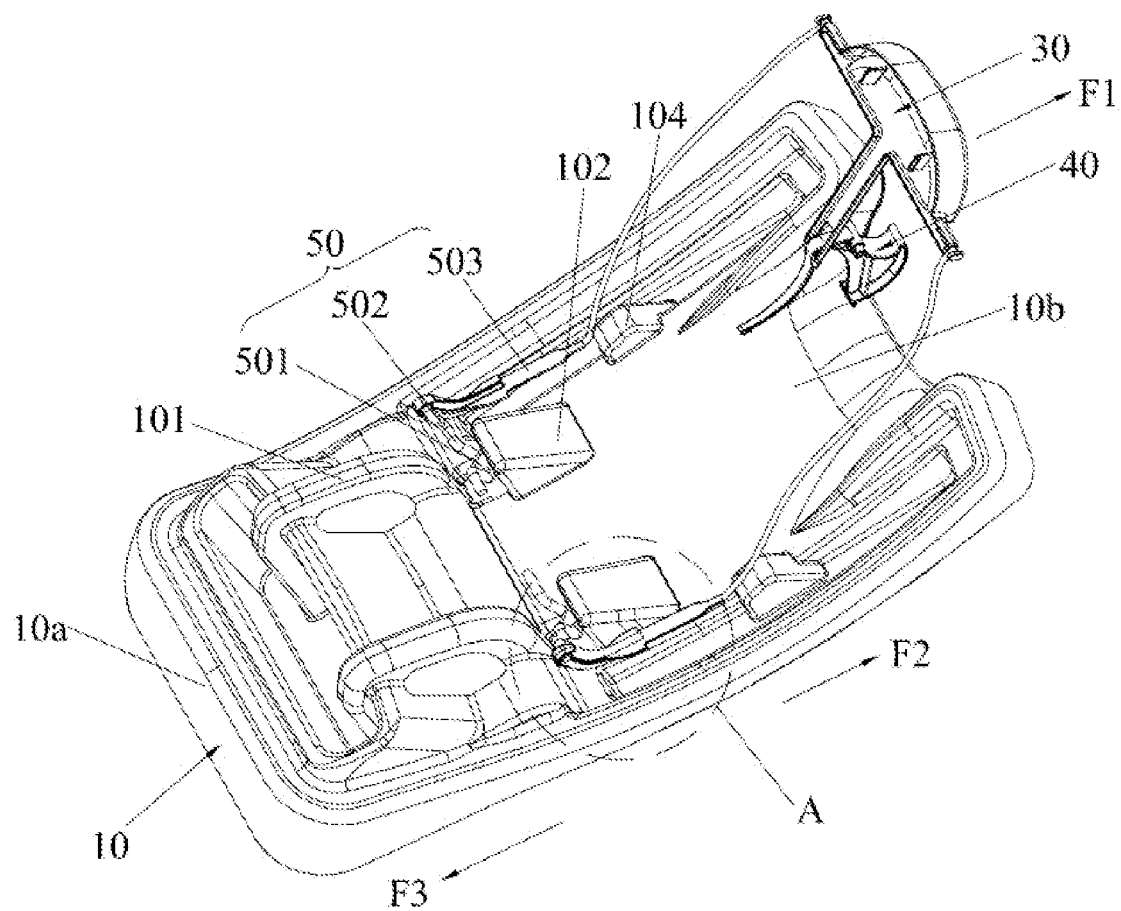
FIG. 5 is a schematic view illustrating the child safety seat assembly shown in FIG. 1 omitting the plastic body of the seat shell.
Figure 6:
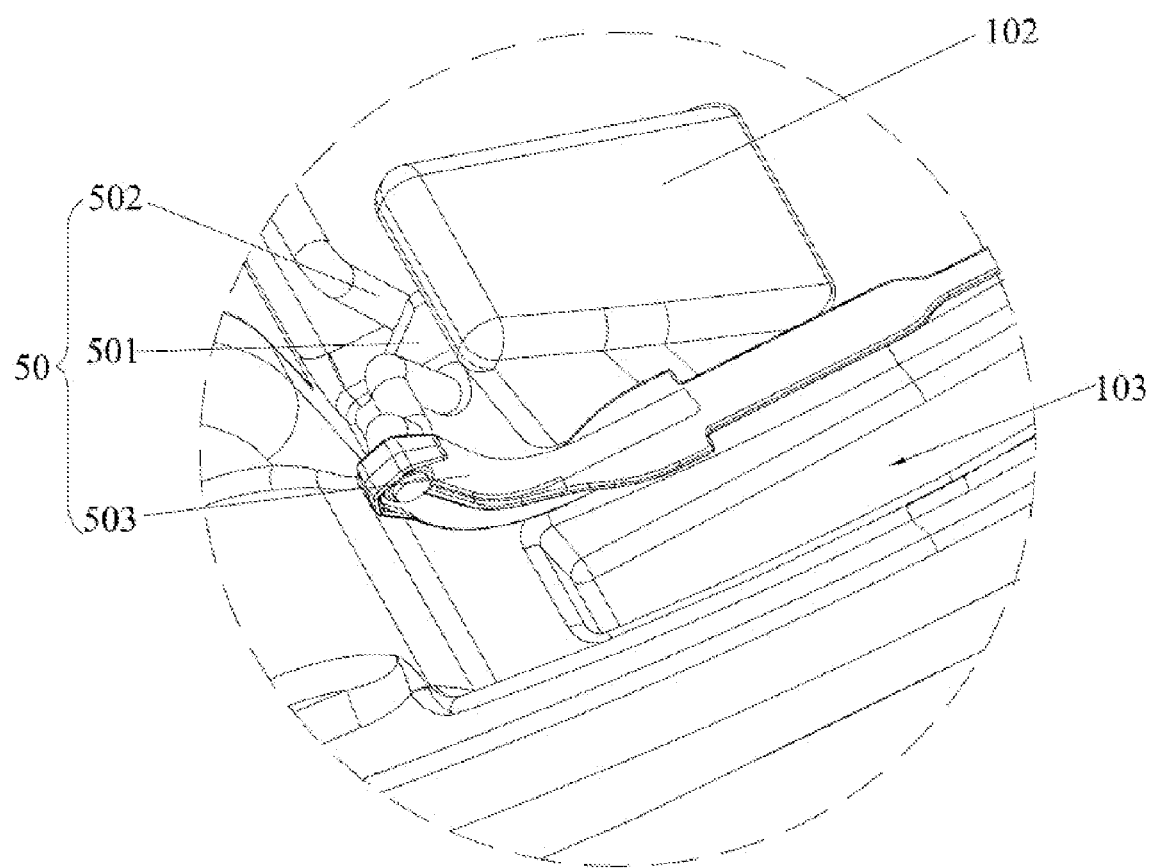
FIG. 6 is an enlarged view of portion A shown in FIG. 5.
Figure 7:
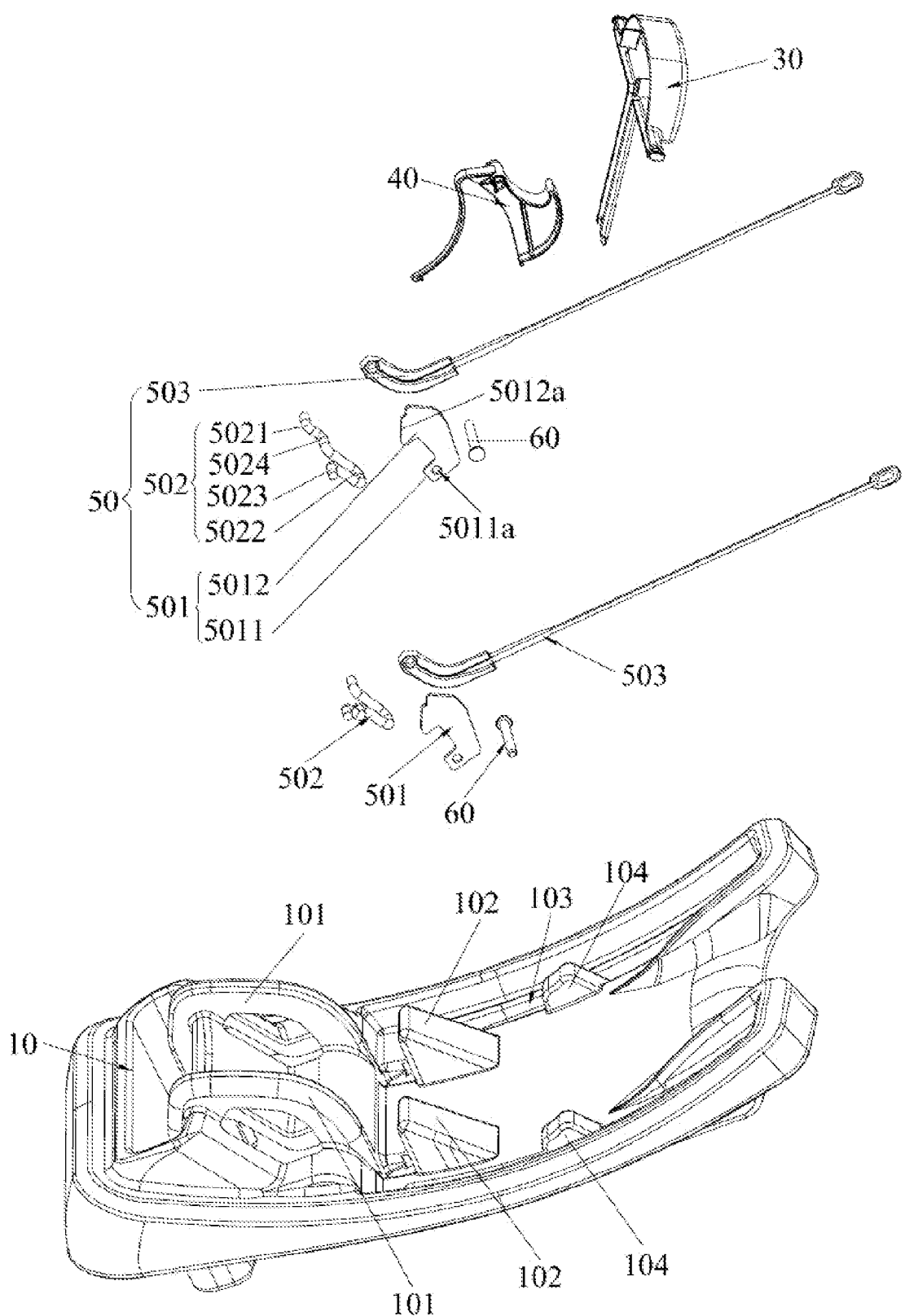
FIG. 7 is an exploded view illustrating the assembly of the release actuator, the connector and the two lock mechanisms in the child safety seat assembly.
Figure 8:
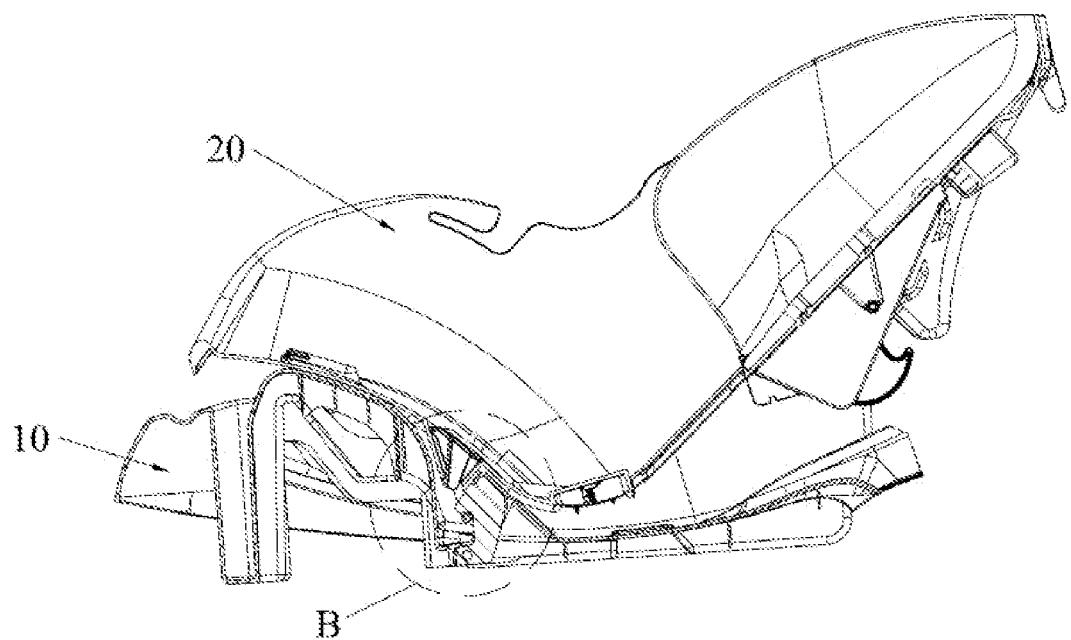
FIG. 8 is a cross-sectional view of the child safety seat assembly shown in FIG. 1.
Figure 9:
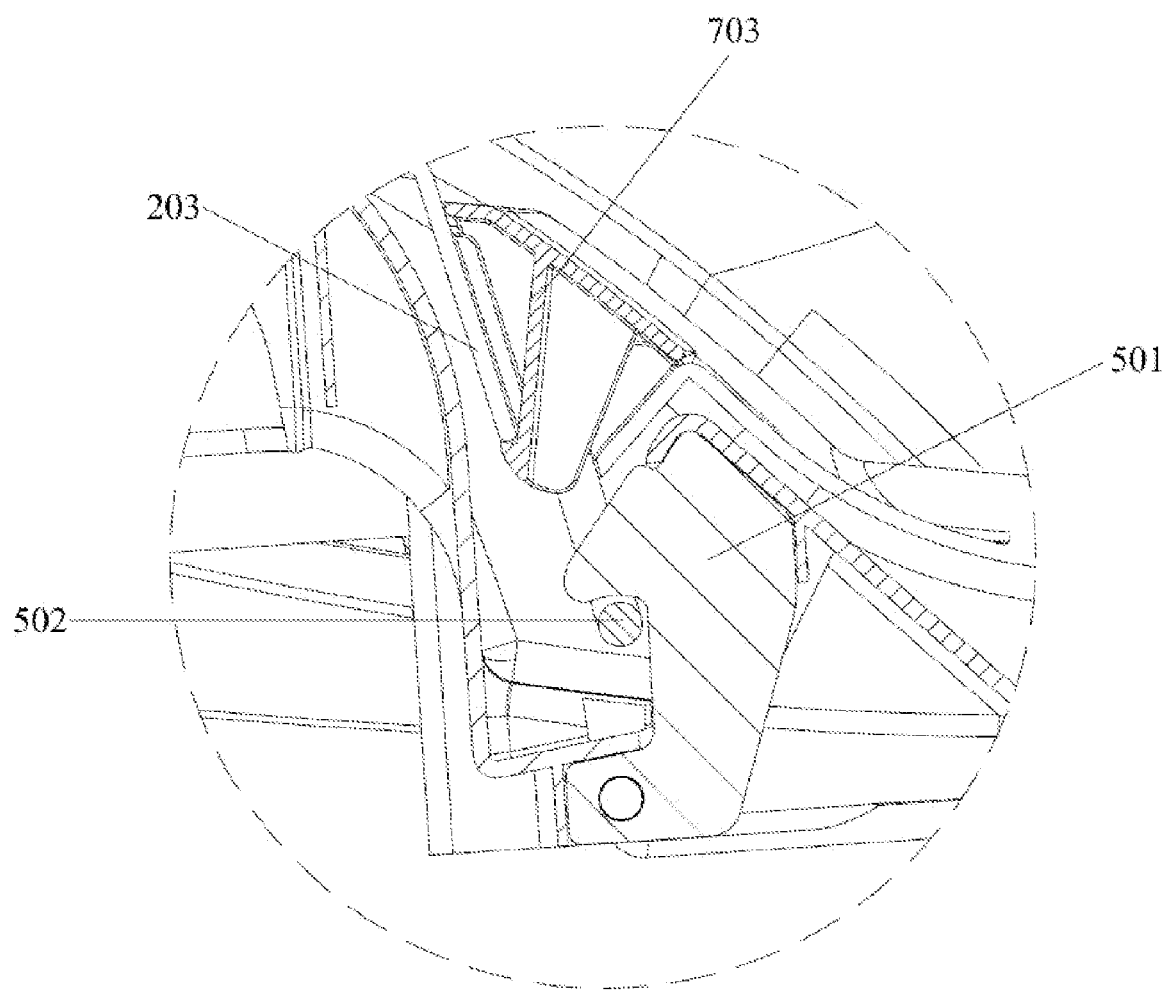
FIG. 9 is an enlarged view of portion B shown in FIG. 8.

As shown in FIGS. 5-7, each lock mechanism 50 can include an anchoring hook 501, a catching collar 502 and a driving part 503. The anchoring hook 501 can be assembled with the base 10, and the catching collar 502 can be assembled with the seat shell 20. The catching collar 502 can engage with the anchoring hook 501 when the seat shell 20 is installed on the base 10. For removing the seat shell 20 from the base 10, the catching collar 502 can be operable to disengage from the anchoring hook 501.

The two anchoring hooks 501 can be respectively affixed with the base 10 in two recessed regions that are delimited between the support portions 101 and the guide members 102 along a lengthwise axis of the base 10. Each of the anchoring hooks 501 can include a mount portion 5011 and a hook portion 5012. The mount portion 5011 can have a hole 5011a through which a connecting member 60 (e.g., pin or rivet) can pass to affix the anchoring hook 501 with the base 10. The hook portion 5012 can be adapted to respectively engage with one associated catching collars 502 when the seat shell 20 is installed on the base 10. The hook portion 5012 can have an outer cam surface 5012a, and may be inclined toward the front portion 10a of the base 10.

Referring to FIG. 7, the two catching collars 502 can be transversally spaced apart and aligned with each other. Each catching collar 502 can be formed in a single body including an engaging portion 5022 having a U-shape bent downward, outer and inner end portions 5021 and 5023 respectively extending transversal at two opposite sides of the engaging portion 5022, and an intermediate segment 5024 joined between the U-shaped engaging portion 5022 and the outer end portion 5021. The intermediate segment 5024 and the inner end portion 5023 can be aligned with each other to define a pivot axis of the catching collar 502 from which the outer end portion 5021 and the engaging portion 5022 are disposed eccentrically opposite to each other. The engaging portion 5022 can rotate about this pivot axis to engage with and disengage from the hook portion 5012.

Figure 10:
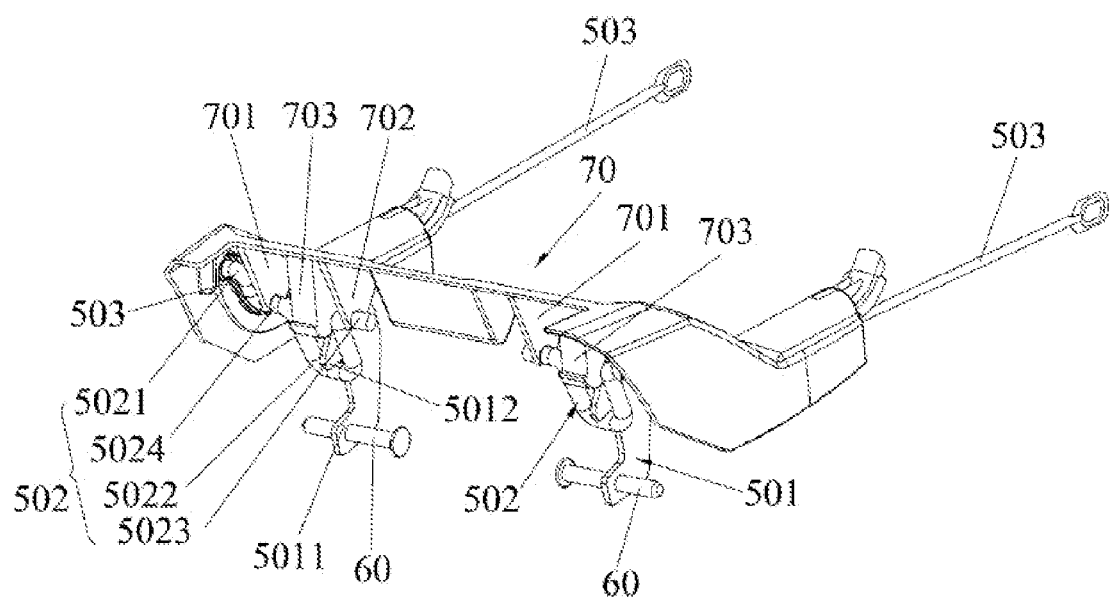
FIG. 10 is a schematic view illustrating the assembly of a portion of the lock mechanism with the seat shell.
Figure 11:
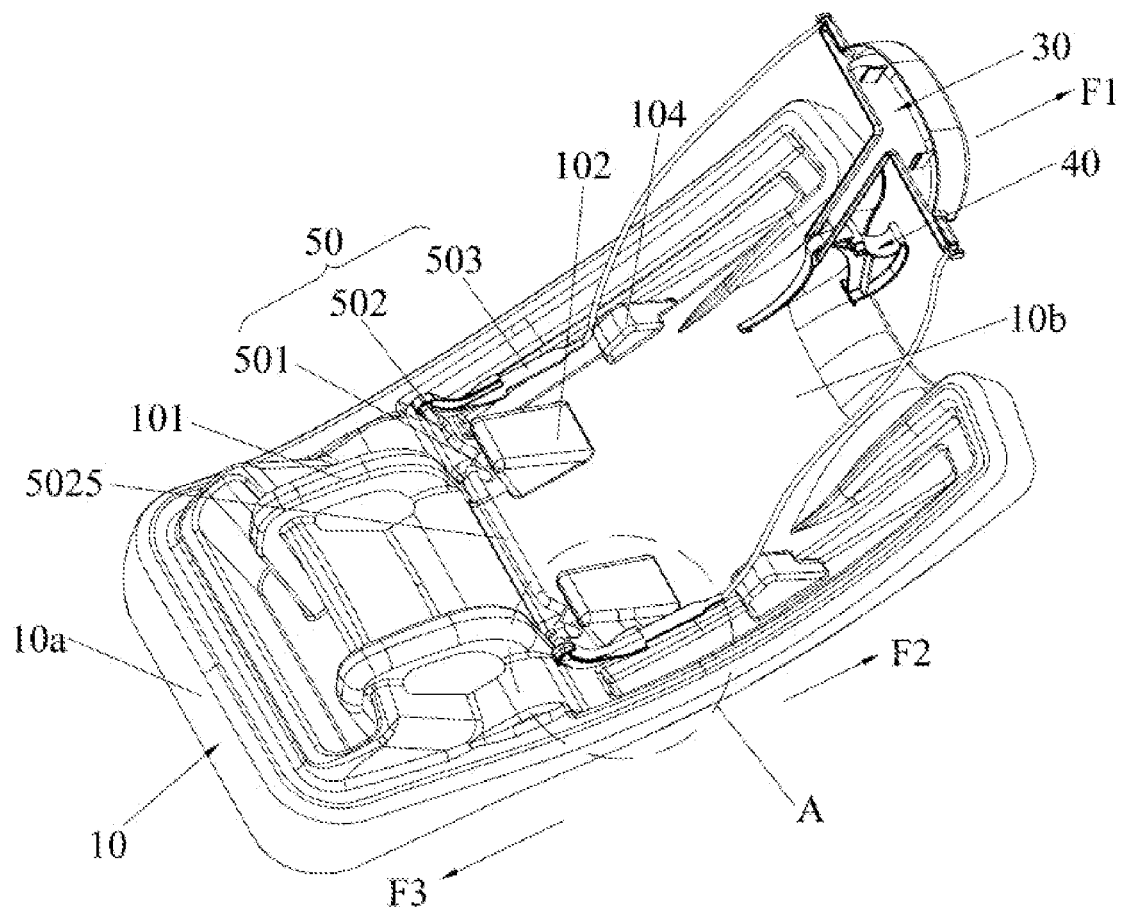
FIG. 11 is a schematic view illustrating a variant embodiment of the child safety seat assembly.

As shown in FIGS. 10 and 11, the inner end portions 5023 of the two catching collars 502 may be joined with each other via a transversal bar linkage 5025 so that the two catching collars 502 can move in unison.

The driving parts 503 can be respectively assembled adjacent to the catching collars 502. Each driving part 503 can have an elongated shape including an end pivotally connected with the outer end portion 5021 of one associated catching collar 502, and another end connected with the release actuator 30. The release actuator 30 can be operable to cause lengthwise displacement of the two driving parts 503, which in turn drive the outer end portions 5021 of the catching collars 502 to rotate toward the rear of the seat shell 20 and the engaging portions 5022 of the catching collars 502 to rotate toward the front of the seat shell 20 for disengaging the catching collars 502 from the anchoring hooks 501.

Referring to FIGS. 7-10, the child safety seat can further include a cover 70 that is fixedly assembled with the seat shell 20 at a position covering the catching collars 502. For ease of installation, the catching collars 502 and the driving parts 503 may be assembled with the cover 70. The cover 70 can have left and right side portions formed with symmetrical structures, each of which including two brackets 701 and 702, and a finger 703 disposed between the two brackets 701 and 702. The brackets 701 and 702 and the fingers 703 can protrude from an inner side of the cover 70.

Each of the catching collars 502 can be pivotally assembled with the brackets 701 and 702 of the cover 70. In particular, the bracket 701 can pivotally connect with the intermediate segment 5024, and the bracket 702 can pivotally connect with the inner end portion 5023. The two catching collars 502 can be pivotally assembled with the cover 70 about a same pivot axis extending transversally relative to the base 10. After the catching collars 502 are assembled with the cover 70, the cover 70 can be affixed with the seat shell 20 by engaging the fingers 703 with catching slots 203 provided in the seat shell 20.

Exemplary installation and detachment of the seat shell 20 and the base 10 are described hereafter with reference to FIGS. 5-7. For installing the seat shell 20 with the base 10, the seat shell 20 can be placed on the base 10 and pushed downward. As a result, the cam surfaces 5012a of the anchoring hooks 501 can push the catching collars 502 in rotation, until the engaging portions 5022 engage with the hook portions 5012. The seat shell 20 can self lock with the base 10 without the need of depressing the release actuator 30. In case a collision occurs pushing the child seat forward, the shape of the hook portions 5012 inclined toward the front portion 10a and partially wrapping around the engaging portions 5022 can allow the hook portions 5012 to firmly hold the catching collars 502 to prevent flipping of the base 10.

For removing the seat shell 20 from the base 10, the release actuator 30 can be actuated in the direction F1, which drives the driving parts 503 to move in the direction F2. Referring to FIG. 10, because the release actuator 30 is disposed above the pivot axis of the catching collars 502 defined by the transverse segments 5024 and the end portion 5023, this displacement of the driving parts 503 can drive the catching collars 502 to rotate in the direction F3 (i.e., toward the front 10a of the base 10) so that the catching collars 502 can respectively disengage and unlock from the anchoring hooks 501. Then the seat shell 20 can be removed from the base 10.

At least one advantage of the child safety seat assembly described herein is the ability to provide lock mechanisms 50 that are simple in construction, and easy to operate for installing and uninstall the seat shell on the base.

Realizations of the child safety seat assembly have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat assembly comprising:
    a base having two fixed anchoring hooks;
    a seat shell detachably installed with the base;
    two catching collars pivotally assembled with the seat shell, each of the catching collar being connected with the seat shell about a pivot axis and having an end portion and an engaging portion respectively located above and below the pivot axis, the catching collars being rotatable to have the engaging portions respectively engaged with the anchoring hooks to hold the seat shell with the base; and
    a release actuator operatively connected with the catching collars at the end portions thereof, the release actuator being operable to rotate the catching collars about the pivot axis to disengage the catching collars from the anchoring hooks.

2. The child safety seat assembly according to claim 1, further including two driving parts movably assembled with the seat shell, wherein each of the driving parts is connected between one catching collar and the release actuator, and the driving parts are movably driven by the release actuator to cause the end portions of the catching collars to rotate toward a rear of the seat shell and the engaging portions of the catching collars to rotate toward a front of the seat shell to disengage from the anchoring hooks.

3. The child safety seat assembly according to claim 1, wherein each of the catching collars includes a U-shape that is rotatable to engage with the corresponding anchoring hook.

4. The child safety seat assembly according to claim 1, wherein the two catching collars are joined with each other via a transversal bar linkage.

5. The child safety seat assembly according to claim 1, wherein each of the anchoring hooks has a first and a second side opposite to each other, when the seat shell is locked with the base, the catching collars respectively engage with the first sides of the anchoring hooks, and the second sides of the anchoring hooks are located between the first sides and the release actuator along a lengthwise axis extending from a rear to a front of the child safety seat assembly.

6. The child safety seat assembly according to claim 1, further including a cover affixed with the seat shell, the catching collars being pivotally assembled with an inner side of the cover at two transversally spaced-apart positions.

7. The child safety seat assembly according to claim 6, wherein the cover includes at least one finger that engages with a catching slot provided in the seat shell for affixing the cover with the seat shell.

8. The child safety seat assembly according to claim 7, wherein the cover includes at least two brackets that are pivotally connected with one of the catching collars, the finger being disposed between the two brackets.

9. The child safety seat assembly according to claim 1, wherein the base includes two support portions protruding upward that are located adjacent to a front of the base, and two guide members protruding upward that are respectively aligned with the support portions along two lengthwise axes of the base.

10. The child safety seat assembly according to claim 9, wherein the two anchoring hooks are respectively disposed in two recessed regions respectively delimited between the two support portions and the two guide members.

11. The child safety seat assembly according to claim 9, wherein the support portions and the guide members have upper surfaces that are respectively inclined to face a same side of the base.

12. The child safety seat assembly according to claim 9, wherein the base includes two elongated slots transversally spaced apart from each other, and the seat shell includes two elongated ribs that are received at least partially in the elongated slots when the seat shell is placed on the base.

13. The child safety seat assembly according to claim 12, wherein the base includes two raised portions respectively disposed adjacent to the two elongated slots, the raised portions being adapted to respectively engage through openings provided at two lower surfaces of the elongated ribs when the seat shell is installed on the base.

14. A child safety seat assembly comprising:
a base having two support portions protruding upward that are transversally spaced apart from each other, two guide members protruding upward that are respectively aligned with the support portions along two lengthwise axes of the base, and two anchoring hooks respectively affixed with the base in two recessed regions respectively delimited between the two support portions and the two guide members;
a seat shell detachably installed with the base;
two catching collars pivotally assembled with the seat shell, each of the catching collar being connected with the seat shell about a pivot axis and having an end portion and an engaging portion respectively located above and below the pivot axis, the catching collars being rotatable to have the engaging portions respectively engaged with the anchoring hooks to hold the seat shell with the base; and
a release actuator operatively connected with the catching collars at the end portions thereof, the release actuator being operable to cause rotation of the catching collars to disengage the catching collars from the anchoring hooks.

15. The child safety seat assembly according to claim 14, further including two driving parts movably assembled with the seat shell, wherein each of the driving parts is connected between one catching collar and the release actuator, and the driving parts are movably driven by the release actuator to cause the catching collars to rotate to disengage from the anchoring hooks.

16. The child safety seat assembly according to claim 14, wherein each of the catching collars includes a U-shape that is rotatable to engage with the corresponding anchoring hook.

17. The child safety seat assembly according to claim 14, wherein the two catching collars are joined with each other via a transversal bar linkage.

18. The child safety seat assembly according to claim 14, wherein the base includes two elongated slots transversally spaced apart from each other, and the seat shell includes two elongated ribs that are received at least partially in the elongated slots when the seat shell is placed on the base.

19. The child safety seat assembly according to claim 18, wherein the two elongated slots are disposed adjacent to outer sides of the guide members and behind the support portions.

20. The child safety seat assembly according to claim 14, wherein each of the anchoring hooks has a first and a second side opposite to each other, when the seat shell is locked with the base, the catching collars respectively engage with the first sides of the anchoring hooks, and the second sides of the anchoring hooks are located between the first sides and the release actuator along a lengthwise axis extending from a rear to a front of the child safety seat assembly.

* * * * *